(12) United States Patent
Richardson

(10) Patent No.: US 10,960,854 B2
(45) Date of Patent: Mar. 30, 2021

(54) SYSTEM FOR WASHING MOTOR VEHICLE HEADLIGHTS

(71) Applicant: Marie Ltd., Hesperus, CO (US)

(72) Inventor: Eric Richardson, Kamloops (CA)

(73) Assignee: MARIC LTD., Hesperus, CO (US)

(*) Notice: Subject to any disclaimer, the term of this patent is extended or adjusted under 35 U.S.C. 154(b) by 0 days.

(21) Appl. No.: 16/054,786

(22) Filed: Aug. 3, 2018

(65) Prior Publication Data

US 2020/0039476 A1 Feb. 6, 2020

(51) Int. Cl.
B60S 1/60 (2006.01)
B60S 1/52 (2006.01)
B05B 9/04 (2006.01)
B05B 1/02 (2006.01)
B60S 1/50 (2006.01)

(52) U.S. Cl.
CPC ............... *B60S 1/603* (2013.01); *B60S 1/52* (2013.01); *B05B 1/02* (2013.01); *B05B 9/0413* (2013.01); *B60S 1/50* (2013.01)

(58) Field of Classification Search
CPC ........ B60S 1/48–60; B60S 1/603; B60S 1/52; B60S 1/50; B60S 1/481; B60S 1/528; B60S 1/58; B60S 1/60; B05B 1/02; B05B 9/0413; B67D 7/70

USPC ................ 239/284.2; 222/255, 330
See application file for complete search history.

(56) References Cited

U.S. PATENT DOCUMENTS

| 3,902,217 | A | * | 9/1975 | Botz | B60S 1/606 |
| | | | | | 15/250.02 |
| 5,657,929 | A | * | 8/1997 | DeWitt | B60S 1/52 |
| | | | | | 15/250.02 |
| 5,779,096 | A | * | 7/1998 | Cockfield | B60S 1/50 |
| | | | | | 116/227 |
| 6,669,110 | B2 | * | 12/2003 | Fukushima | B60S 1/481 |
| | | | | | 239/284.1 |
| 6,951,223 | B2 | * | 10/2005 | Fukushima | B60S 1/481 |
| | | | | | 134/186 |
| 2003/0222156 | A1 | * | 12/2003 | Bissonnette | B60S 1/488 |
| | | | | | 239/284.1 |
| 2014/0367488 | A1 | * | 12/2014 | Dominique | B60S 1/50 |
| | | | | | 239/284.2 |

* cited by examiner

*Primary Examiner* — Arthur O. Hall
*Assistant Examiner* — Steven M Cernoch
(74) *Attorney, Agent, or Firm* — Neugeboren O'Dowd PC

(57) ABSTRACT

The present invention for rights for a system configured for use with an existing motor vehicle windshield washer system whereby a portion of solution is directed to a headlamp washing outlet.

4 Claims, 3 Drawing Sheets

SYSTEM FOR WASHING MOTOR VEHICLE HEADLIGHTS

BACKGROUND OF THE INVENTION

Since the invention of the motor vehicle, significant attention has been given to improvements in safety. Although there have been many attempts to provide for the safety and efficiency of headlights, there still is a major deficiency in the industry. This deficiency relates to debris accumulating on headlights while the motor vehicle is operating.

The present invention addresses this deficiency.

SUMMARY OF THE INVENTION

In one embodiment, the present invention is a headlight washer system constructed and arranged to be used with an existing windshield washer system, said headlight washer system comprising:
an existing windshield washer system having a windshield washer solution reservoir, a primary pump constructed and arranged to receive solution exiting from said reservoir, a primary pump actuator, a primary pump solution outlet line, and a windshield washer solution outlet;
a secondary pump constructed and arranged with a dedicated actuator;
a primary outlet split device that divides solution exiting from said primary solution outlet line into a windshield washer fluid solution supply line and a secondary pump inlet line;
an outlet line directing solution from said secondary pump to a backflow valve, said backflow valve constructed and arranged with an outlet that divides incoming windshield washer fluid solution into two identical backflow valve outlet lines;
a vehicle headlamp solution exit constructed and arranged to receive solution from a backflow valve outlet line and deliver said windshield washer solution to a vehicle headlamp, said solution exits held into position by a solution exit bracket and a solution exit bracket support.

In one embodiment, the present invention is a headlight washer system constructed and arranged to be used with an existing windshield washer system, said headlight washer system consisting essentially of:
an existing windshield washer system having a windshield washer solution reservoir, a primary pump constructed and arranged to receive solution exiting from said reservoir, a primary pump actuator, a primary pump solution outlet line, and a windshield washer solution outlet, whereby said windshield washer solution outlet is constructed and arranged to deliver windshield washer cleaning solution to a vehicle windshield as is commonly done;
a secondary pump constructed and arranged with a dedicated actuator;
a primary outlet split device that divides solution line exiting from said primary solution outlet line into a windshield washer fluid solution supply line and a secondary pump inlet line;
an outlet line directing solution from said secondary pump to a backflow valve, said backflow valve constructed and arranged with an outlet that divides incoming windshield washer fluid solution into two identical backflow valve outlet lines;
a vehicle headlamp solution exit constructed and arranged to receive solution from a backflow valve outlet line and deliver said windshield washer solution to a vehicle headlamp, said solution exits held into position by a solution exit bracket and a solution exit bracket support.

DETAILED DESCRIPTION OF THE PREFERRED EMBODIMENT

Figure 1:
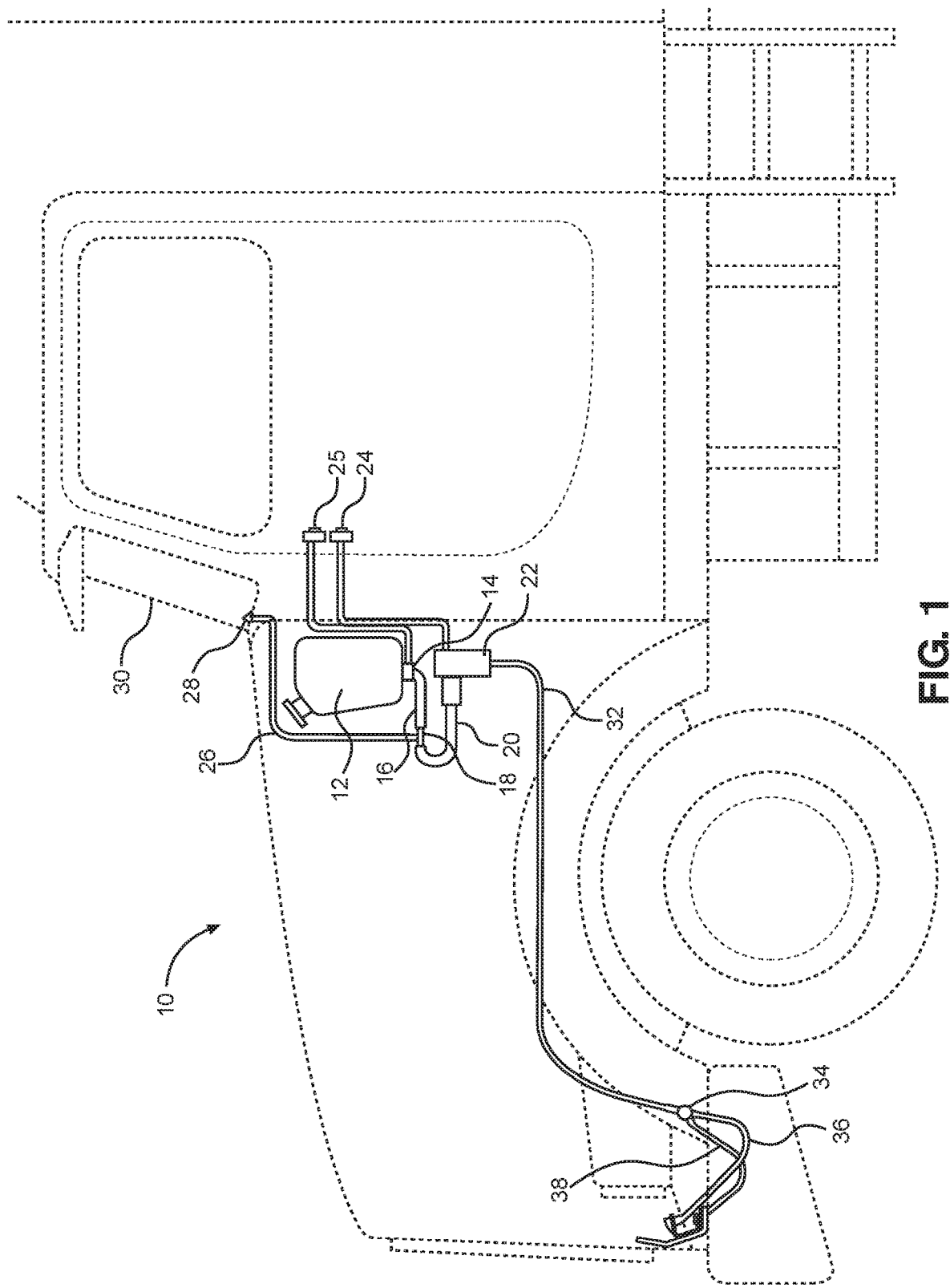
FIG. 1 is a side partial cross-section view of one embodiment of the present invention.
Figure 2:
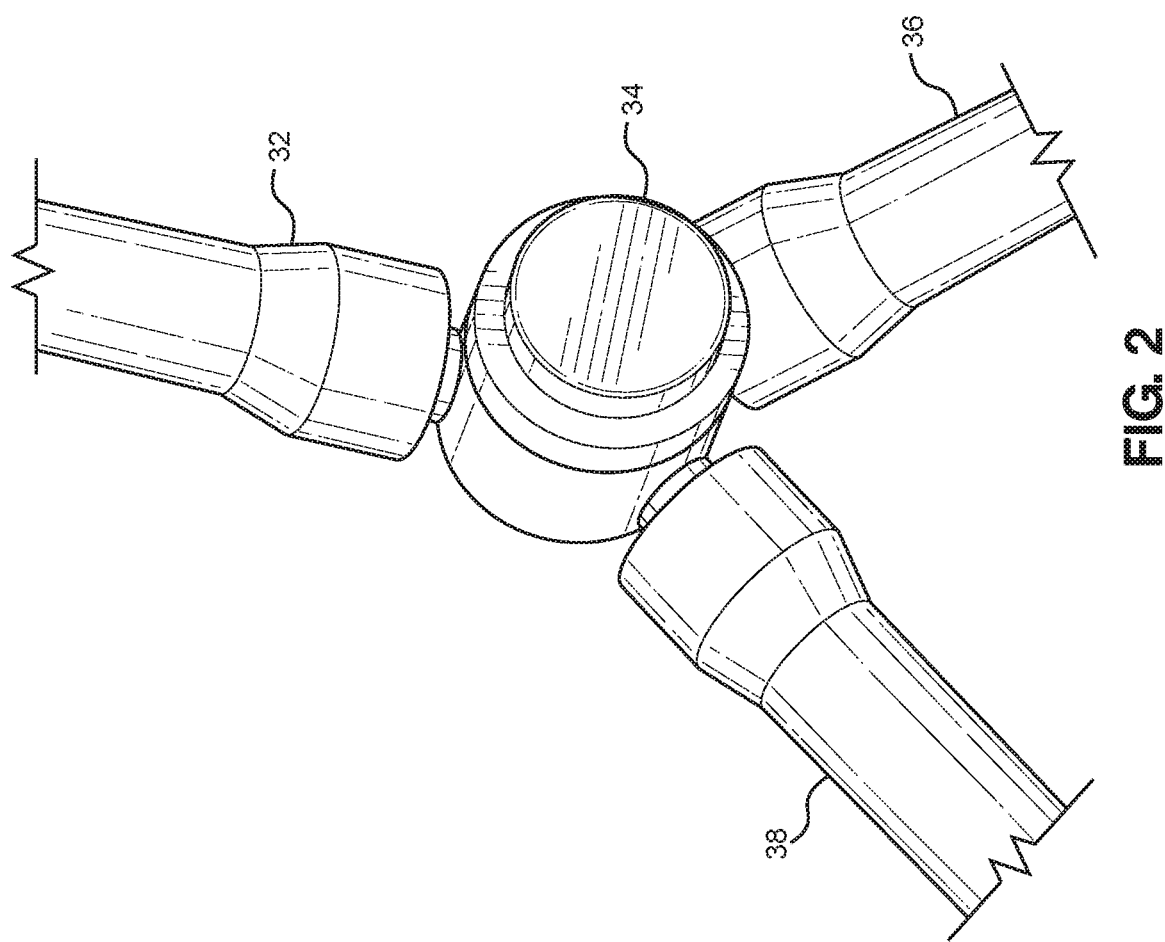
FIG. 2 is an expanded partial view of a backflow valve according to one about them in the present invention.

The present invention provides a system 10 that is constructed and arranged to be fitted onto a motor vehicle with an existing windshield washer system. Reservoir 12 which is standard equipment on all motor vehicles is a reservoir for holding windshield washer solvent fluid. Primary pump 14, also standard on all motor vehicles draws solution out of reservoir 12 and typically directs it through windshield supply line outlet 28 onto windshield 30. The present invention provides for components that are used with existing systems.

Primary pump 14 has primary pump outlet line 16. In the present invention, primary pump outlet line 16 is cut and primary outlet split device 18 is incorporated such that fluid passing through primary pump outlet line 16 is divided and directed into windshield washer fluid supply line 26 and secondary pump inlet 20. Secondary pump inlet 20 supplies fluid to secondary pump 22.

Figure 3:
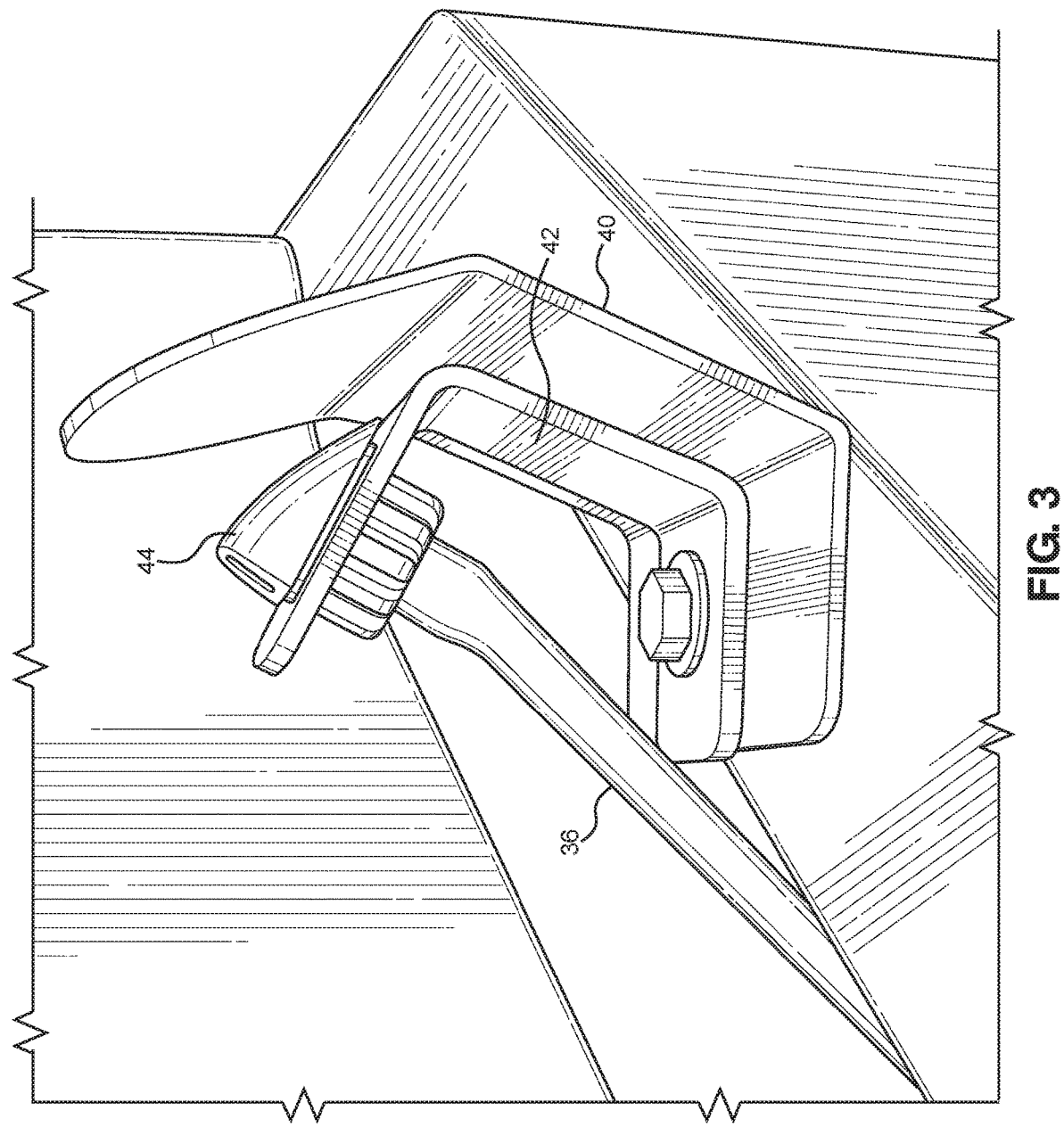
FIG. 3 is a view of a headlamp wash system according to one vitamin of the present invention.

Secondary pump 22 has a dedicated secondary pump actuator 24 activated by the driver as desired. When activated, secondary pump actuator 24 activates secondary pump 22 and forces windshield washer solvent through secondary pump outlet line 32 where it is directed towards backflow valve 34. Backflow valve 34 divides the solution flow into a first backflow outlet 38 and second backflow outlet 36. Although not shown in the figures, each of first backflow outlet 38 and second backflow outlet 36 deliver solution to identical structures. As demonstrated in FIG. 3, second backflow outlet 36 delivers solution to headlamp washer outlet 44 which is held in place by headlamp washer outlet bracket 42 and supported by headlamp outlet bracket support 40.

As generally understood and demonstrated in FIG. 1, washer solution exits headlamp washer outlet 44 and is directed onto the vehicle headlamps and subsequently washes dirt and debris off of vehicle headlamps.

In one aspect of operation, the existing vehicle windshield washer actuator 25 will provide solution to each of windshield washer solution outlet 28 and headlamp washer outlet 44.

If it is only desired to use the headlamp washer aspect of the system, a user will actuate secondary pump actuator 24 and deliver windshield washer solution only to headlamp washer outlet 44.

In configuring the system, a few characteristics have demonstrated improved and favorable results. In one embodiment, each of primary pump 14, supplied with the motor vehicle and secondary pump 22, added as an aftermarket add-on are preferably of similar strength.

In another embodiment, it is preferable to position secondary pump 24 below the vertical height relative to the ground of primary pump 14.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A headlight washer system constructed and arranged in combination with an existing windshield washer system, said combination comprising:
   an existing windshield washer system having a windshield washer solution reservoir, a primary pump constructed and arranged to receive windshield washer solution exiting from said windshield washer solution reservoir, a primary pump actuator, a primary pump solution outlet line, and a windshield washer solution outlet;
   a secondary pump constructed and arranged with a dedicated actuator; a primary outlet split device that divides the windshield washer solution exiting from said primary pump solution outlet line into a windshield washer fluid solution supply line and a secondary pump inlet line;
   an outlet line directing windshield washer solution from said secondary pump to a backflow valve, said backflow valve constructed and arranged with an outlet that divides incoming windshield washer fluid solution into two backflow valve outlet lines; and a pair of vehicle headlamp solution exits constructed and arranged to receive windshield washer solution from the two backflow valve outlet lines and deliver said windshield washer solution to each vehicle headlamp, said pair of vehicle headlamp solution exits each held into position by a solution exit bracket and a solution exit bracket support.

2. The system of claim 1, wherein said secondary pump is positioned at a vertical height below said primary pump.

3. The system of claim 1 wherein said primary actuator is configured to deliver windshield washer solution from said windshield washer solution reservoir to each of said windshield washer solution outlet and the pair of vehicle headlamp solution exits.

4. The system of claim 1 wherein said secondary actuator is configured to deliver windshield washer solution from said windshield washer solution reservoir to only the pair of vehicle headlamp solution exits.

* * * * *

UNITED STATES PATENT AND TRADEMARK OFFICE
CERTIFICATE OF CORRECTION

PATENT NO. : 10,960,854 B2  
APPLICATION NO. : 16/054786  
DATED : March 30, 2021  
INVENTOR(S) : Eric Richardson Page 1 of 1

It is certified that error appears in the above-identified patent and that said Letters Patent is hereby corrected as shown below:

On the Title Page

Item (71) Applicant:  
Marie Ltd., Hesperus, CO (US)  
Corrected To:  
Maric Ltd., Hesperus, CO (US)

Signed and Sealed this  
Tenth Day of June, 2025

Coke Morgan Stewart  
*Acting Director of the United States Patent and Trademark Office*